(12) United States Patent
Kauffman et al.

(10) Patent No.: US 6,288,338 B1
(45) Date of Patent: *Sep. 11, 2001

(54) BUS ISOLATION SYSTEM

(75) Inventors: Eric J. Kauffman, Roanoke; Paul S. Pate, Troutville; Andrew C. Stevenson, Roanoke, all of VA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/583,159

(22) Filed: May 30, 2000

Related U.S. Application Data

(63) Continuation of application No. 09/208,068, filed on Dec. 9, 1998, now Pat. No. 6,133,533.

(51) Int. Cl.$^7$ ........................................... H02G 5/00
(52) U.S. Cl. .................. 174/99 B; 174/71 B; 174/72 B; 174/99 R
(58) Field of Search ................... 174/99 B, 71 B, 174/72 B, 99 R, 40 CR, 49 B, 154, 167

(56) References Cited

U.S. PATENT DOCUMENTS

| | | | |
|---|---|---|---|
| 1,977,957 | 10/1934 | Stevens | 173/318 |
| 1,978,649 | 10/1934 | Roberts | 173/318 |
| 2,039,793 * | 5/1936 | Harvey | 247/3 |
| 2,044,604 | 6/1936 | Cornell et al. | 173/251 |
| 2,059,988 | 11/1936 | Frank | 247/3 |
| 2,230,423 | 2/1941 | Bassette et al. | 174/72 |
| 2,262,067 | 11/1941 | Togesen et al. | 174/95 |
| 2,306,353 | 12/1942 | Cole et al. | 173/334.1 |
| 2,318,859 | 5/1943 | Huguelet | 248/68 |
| 2,435,113 | 1/1948 | Adam | 174/99 |
| 2,938,942 | 5/1960 | Stanback et al. | 174/99 |
| 2,985,710 | 5/1961 | Davis et al. | 174/99 |
| 2,994,658 | 8/1961 | Preiser et al. | 204/196 |
| 3,113,820 | 12/1963 | Norden | 339/22 |
| 3,187,086 | 6/1965 | Moodie et al. | 174/68 |
| 3,315,132 | 4/1967 | Lucas | 317/99 |
| 3,384,854 | 5/1968 | Jorgensen et al. | 339/22 |
| 3,584,137 * | 6/1971 | Weimer | 174/68 |
| 3,601,525 | 8/1971 | Oravec | 174/171 |
| 5,053,584 * | 10/1991 | Chojnowski | 174/99 B |
| 5,422,440 | 6/1995 | Palma | 174/133 B |
| 6,133,533 * | 10/2000 | Kauffman et al. | 174/99 B |

* cited by examiner

Primary Examiner—Dean A. Reichard
Assistant Examiner—W. David Walkenhorst
(74) Attorney, Agent, or Firm—Welsh & Katz, Ltd.; Damian G. Wasserbauer; Carl B. Horton

(57) ABSTRACT

An electrical bus isolation system includes a pair of bus bar supporting members, each of which includes a first substantially flat surface portion configured to retain a first bus bar, and second and third substantially flat surface portions each disposed on opposite sides of the first surface portion, and defining an offset in height from the first surface portion. The second and third surface portions are configured to retain opposite lateral sides of a second bus bar when the pair of supporting members are operatively engaged, with corresponding second and third surface portions facing each other such that the first bus bar is retained in a fixed position relative to the second bus bar in a parallel spaced relationship thereto and at a distance determined by the offset in height. An air gap between the bus bars electrically isolates the bus bars and prevents corona discharge between the bus bars.

26 Claims, 1 Drawing Sheet

BUS ISOLATION SYSTEM

This is a continuation of Ser. No. 09/208,068, filed Dec. 9, 1998, entitled Bus Isolation System now U.S. Pat. No. 6,133,533.

FIELD OF THE INVENTION

The present invention generally relates to the isolation and insulation of electrical power busses, and more particularly, to an inexpensive and reliable system for isolating high-power electrical busses that are located in close proximity to each other such that electrical corona discharge between conductors is eliminated.

BACKGROUND OF THE INVENTION

It is a standard practice to use insulated bus bars in electrical equipment. High-power electrical distribution systems may suffer from corona discharge between conductors, which seriously degrades system performance, and may present a safety danger. This problem increases as the voltage levels increase and/or the physical separation between the conductors decrease.

In high-voltage electrical transmission, such as in long distance power transmission, corona discharge is reduced by spacing the conductors apart by large distances, as seen in high-tension electrical transmission towers. But this is not practical in closed environments, where inductive reactance must be minimized. Although close spacing of the conductors increases the tendency for corona discharge to occur in adjustable-speed devices, such close spacing improves system performance by reducing parasitic reactants.

To overcome the problems associated with closely spaced conductors, typical electrical distribution systems insulate the conductors or place insulation between adjacent conductors. As voltage levels increase, corona discharge increases, and the insulation degrades over time. Degradation of the insulation is dependent upon temperature, humidity, and voltage levels, and leads to corona discharge and further degradation of the insulation. Eventually, a short circuit may occur, which seriously affects system performance, and may pose a danger to human life.

Some known systems address this problem by eliminating the air between the conductors. This is accomplished by sealing the conductors in a chamber or conduit and evacuating the air. This method, however, is very expensive and is dependent upon the level of vacuum achieved, surface preparation of the conductors, and electrical braking cycles.

SUMMARY OF THE INVENTION

An electrical bus isolation system includes a pair of bus bar supporting members, each of which includes a first substantially flat surface portion configured to retain a first bus bar, and second and third substantially flat surface portions each disposed on opposite sides of the first surface portion, and defining an offset in height from the first surface portion. The second and third surface portions are configured to retain opposite lateral sides of a second bus bar when the pair of supporting members are operatively engaged, with corresponding second and third surface portions facing each other such that the first bus bar is retained in a fixed position relative to the second bus bar in a parallel spaced relationship thereto, and at a distance determined by the offset in height.

An air gap between the bus bars electrically isolates the bus bars and prevents corona discharge between the bus bars. The bus isolation system permits high-voltage, high-power conductors or bus bars to be in very close proximity, such as about 0.25 inches apart, yet corona discharge between the conductors is eliminated. Further, the present invention accomplishes this using inexpensive conventional components formed of non-exotic material. Because the electrical conductors are closely spaced, inductive reactance of the system is reduced, thus improving the electrical characteristics of the system.

Other features and advantages of the invention will become apparent from the description that follows.

DETAILED DESCRIPTION OF THE INVENTION

Figure 1:
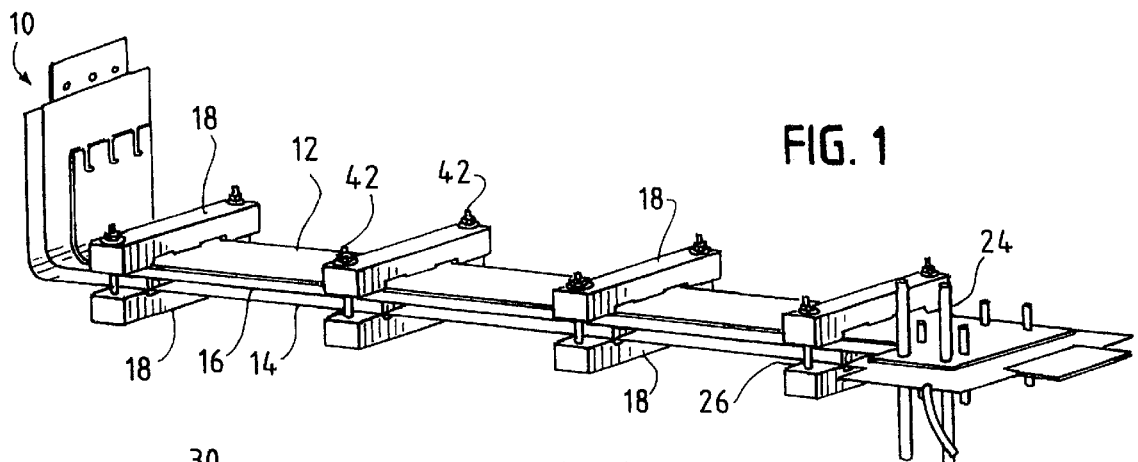
FIG. 1 is a perspective view of a specific embodiment of a bus isolation system.

Referring now to FIG. 1, a bus isolation system 10 is shown generally. The bus isolation system 10 isolates and retains a plurality of bus bars, namely, a positive bus bar or conductor 12, a negative bus bar or conductor 14, and a neutral bus bar or conductor 16, in a parallel, spaced relation to each other. It will be appreciated that two or three, or more bus bars may be retained and isolated in this manner. The bus isolation system 10 includes a pair of bus bar supporting members 18, which physically retains and isolates the bus bars 12, 14, 16.

Figure 2:
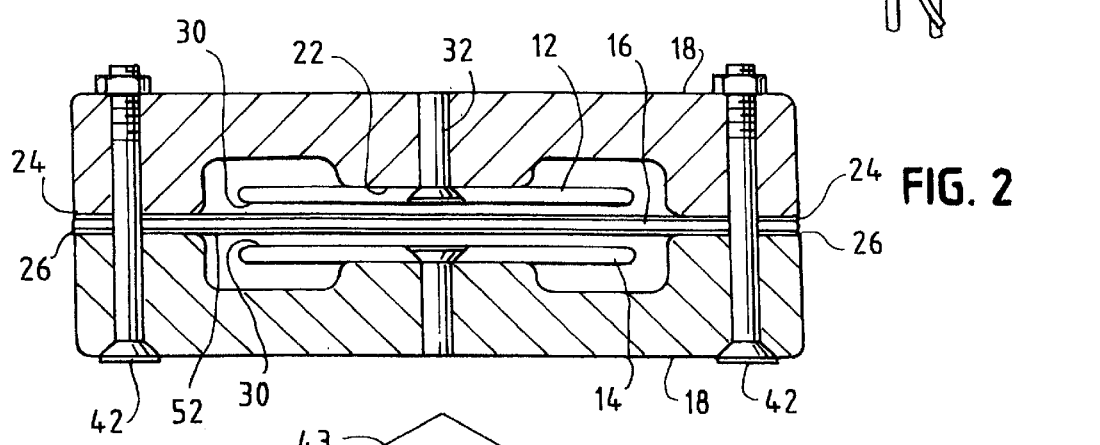
FIG. 2 is a side elevational view of a pair of support members of the bus isolation system of FIG. 1, shown in operative engagement.
Figure 3:
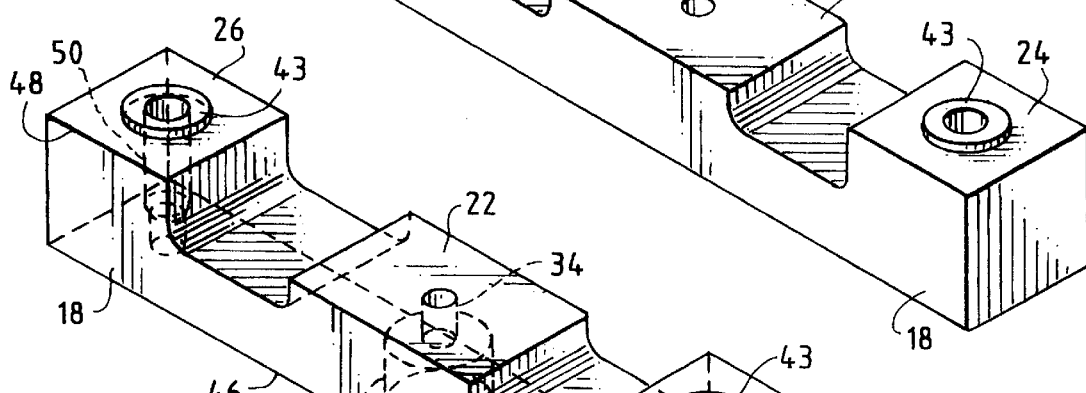
FIG. 3 is a perspective view of a support member shown in FIG. 2.

Referring now to FIGS. 1–3, FIGS. 2 and 3 illustrate a specific embodiment of the supporting member(s) 18, which are generally "E-shaped" members, as shown in the cross-sectional view. Each supporting member 18 includes a middle portion 22, an end portion 24, and an end portion 26 opposite end portion 24. The middle portion 22 is substantially flat and is configured to retain the first bus bar, which may be either the positive bus bar 12 or the negative bus bar 14, depending upon the orientation of the supporting members 18. It is not material to the scope of this invention whether the positive bus bar 12 or the negative bus bar 14 is on top or bottom with respect to the supporting members 18. The end portions 24, 26 are also substantially flat, and are configured to retain the neutral bus bar 16, which is preferably wider than either the positive bus bar 12 or the negative bus bar 14.

As shown in FIGS. 2–3, the end portions 24, 26 are disposed on opposite sides of the middle portion 22, and define an offset in height from the middle portion. Preferably, the difference in height is sufficient to retain each bus bar 12, 14, 16 in a spaced orientation about 0.25 inches from adjacent bus bars. This, of course, depends upon the thickness of the bus bars 12, 14, 16, which are preferably 0.25 inches in thickness, however, the bus bars are not limited to a specific thickness, and any suitable thickness may be used. Preferably, the supporting members 18 are about eleven inches in length, about two inches in width, and about two inches in height. of course, these dimensions may be varied without affecting the scope of the claims. To accommodate the bus bars 12, 14, 16 in a proper spaced relation, the height of the middle portion 22 is preferably about 1.5 inches, while the height of the end portions 24, 26 is about two inches, thus forming about a one-half inch height difference between the middle portion and the end portions.

As shown in FIGS. 1 and 2, two supporting members 18 are operatively engaged with corresponding end portions 24 and 26 facing each other. The middle portion 22 of one supporting member retains and isolates either the positive bus bar 12 or the negative bus bar 14, while the neutral bus bar 16 is essentially clamped between corresponding end portions. Thus, the positive bus bar 12 and the negative bus bar 14 are retained in a fixed position relative to the neutral bus bar 16 in a parallel spaced relationship and at a distance determined by the offset in height between the middle portion 22 and the end portions 24, 26.

As shown in FIG. 2, the positive bus bar 12 and the negative bus bar 14 may be fastened to the middle portion 22 by a fastener that is substantially flush with a surface 30 of the corresponding bus bar. This assures that the 25 positive and negative bus bars 12, 14 are fixedly retained in a parallel orientation relative to the neutral bus bar with no surface protrusions, and at a distance of about 0.25 inches from the neutral bus bar 16, as determined by the physical dimensions of the bus bars 12, 14, 16 and the supporting members 18. In one embodiment, the positive bus bar 12 and negative bus bar 14 may be fastened to the middle portion 22 via a self-gripping stud or PEM-type stud.

Figure 4:
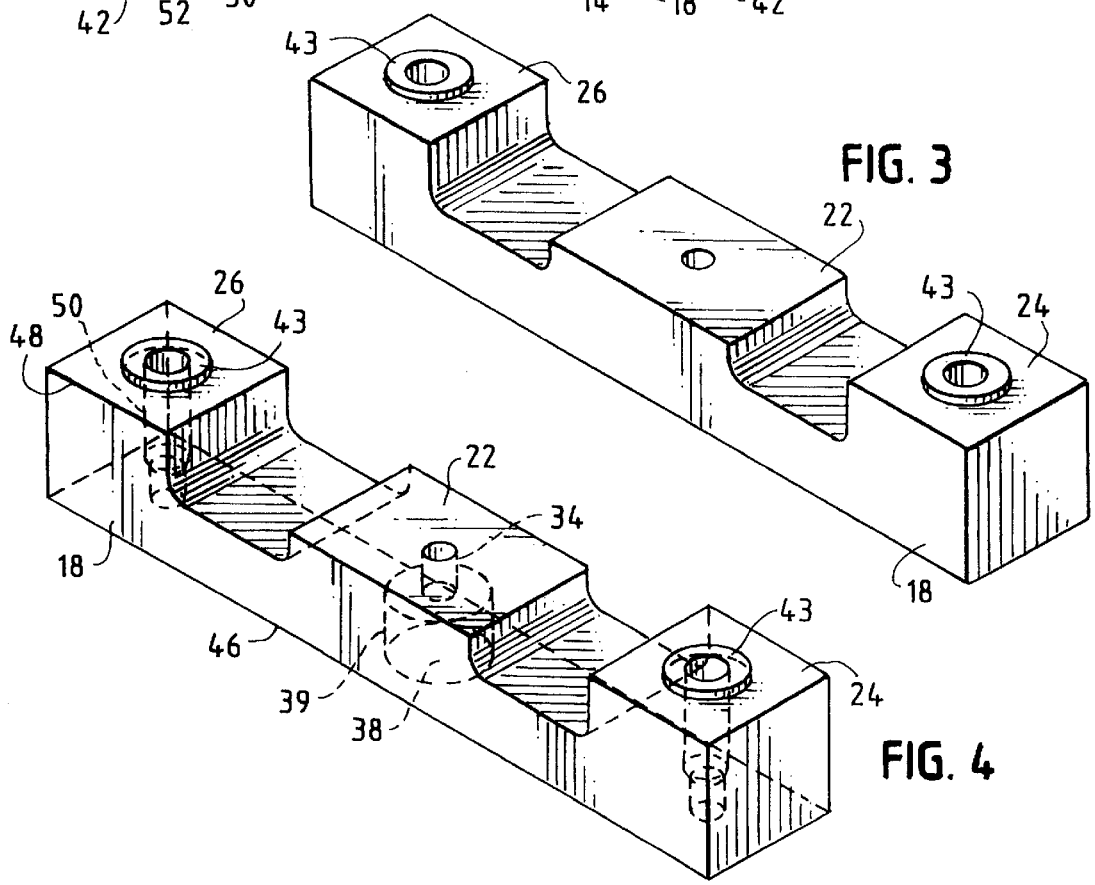
FIG. 4 is a partial sectional view of a support member shown in FIG. 2.

In the preferred embodiment shown in FIG. 4, the stud 32 (FIG. 2) contacts the middle portion 22, but does not fully engage the material of the supporting member 18 through the entire body of the supporting member. In this illustrated embodiment, the stud 32 (FIG. 2) extends through a fastener gripping portion 34 of the supporting member 18 for a first predetermined depth. The diameter of the fastener gripping portion 34 is sufficient to form a frictional fit with the stud 32 (FIG. 2) so as to secure the stud in place. As shown in FIG. 2, the head of the self-gripping stud 32 is flush with the surface of the bus bar 12, 14. The stud 32 (FIG. 2) further extends through a fastener isolating portion 38 of the supporting member 18, which is adjacent the fastener gripping portion, and extends for a second predetermined depth. The fastener isolating portion 38 defines a chamber 39 about the fastener 32 (FIG. 2), which increases the electrical isolation between the bus bars 12, 14 and the supporting member 18.

As shown in FIG. 2, the positive and negative bus bars 12, 14 are secured to the middle portion 18 by the stud 32, while the neutral bus bar 16 is essentially "sandwiched" or clamped between the end portions 24, 26 of the supporting members 18 when a pair supporting members are clamped or secured together. The neutral bus bar 16 is wider than the positive or negative bus bars 12, 14, and spans the ends 24, 26 of the supporting members 18.

As shown in FIG. 1, the pair of supporting members 18 are clamped together with a pair of bolts 42, which when tightened, cause a frictional fit to be formed with the neutral bus bar 16 and the supporting members sufficient to fixedly retain the neutral bus bar in place. Preferably, according to the illustrated embodiment of FIGS. 3 and 4, each end portion 24, 26 includes raised alignment bosses 43 (FIGS. 3–4) to facilitate alignment of the neutral bus bar 16. The neutral bus bar 16 includes apertures at opposite ends, where each aperture has a diameter slightly greater than the diameter of the bosses 43. The bosses 43 are raised and have a height about equal to or slightly less than one-half of the thickness of the neutral bus bar 16.

Accordingly, the bosses 43 act to align and retain the neutral bus bar 16 in place when the supporting lo members 18 are clamped together. Even if the bolt 42 is not completely tightened, the bosses 43 of the opposing supporting members 18 "fill" the aperture in the neutral bus bar 16 and would permit only a minimal amount of play, as governed by the differences in the respective diameters of the bosses 34 and the apertures in the neutral bus bar 16.

As shown in the preferred embodiment of FIG. 4, the bolts 42 (FIG. 2) are further isolated from the supporting member 18 via a dual-diameter aperture formed in the end portions 24, 26. The diameter of the aperture at an external edge 46 of the supporting member 18 is about equal to the diameter of the bolt 42 (FIG. 2) such that a frictional fit is formed therebetween. The diameter of the aperture changes at a predetermined depth as the aperture approaches an internal edge 48 of the supporting member 18. Thus, a hollow chamber 50 is formed around the bolt 42 (FIG. 2) in the general area where it is closest to the neutral bus bar 16 (i.e., the "clamping" portion of the end portions 24, 26) so as to further electrically isolate the bolt from the neutral bus bar.

Referring back to FIGS. 1 and 2, when the bus bars 12, 14, 16 are fixedly retained by the supporting members 18, each bus bar is separated from the adjacent bus bar by an air gap of about 0.25 inches, as determined by the geometry and dimensions of the bus bars and the supporting members. Preferably, an air gap of about 0.25 inches exists, however, an air gap of about 0.16 inches or greater is sufficient to electrically isolate the bus bars 12, 14, 16 so that corona discharge between the bus bars is eliminated. Because air is an excellent insulator, no insulating material is required between the bus bars 12, 14, 16. In fact, because voltage over 6,000 volts may be used, material insulation between the bus bars is undesirable, as it tends to breakdown when exposed to such high voltage levels. When the insulation breaks down, corona discharge between the bus bars increases. Thus, the bus bars 12, 14, 16 are essentially uninsulated metal bars separated from each other by an air gap, which provides complete electrical isolation between the bus bars and prevents corona discharge. Even at voltage levels greater than 8,800 volts between the positive or negative bus bars 12, 14, and the neutral bus bar 16 (greater than 16,000 volts end-to-end), the air gap therebetween is effective to achieve electrical isolation. Accordingly, the present invention permits high-power bus bars to be spaced in close proximity while simultaneously eliminating corona discharge. Alternatively, a thin layer of NOMEX insulation 52 (FIG. 2) may be applied to the neutral bus bar 16 to improve the electrical characteristics of the system, but such a layer is not added to provide substantial electrical isolation.

Further, the supporting members 18 are inexpensive and easy to manufacture, and may be formed of a variety of non-exotic insulating materials. For example, the supporting members 18 may be formed of plastic, resin-based plastics, polyester fiberglass, ceramic, DELRIN, or any other suitable insulating material. In a typical electrical distribution installation, such as on a ship, the supporting members are preferably spaced about every eighteen inches along a continuous length of bus bar.

As described above, the structure of the supporting members 18 is straight forward. As such, typical variations in manufacturing tolerances have little or no affect on the final product as long as the structural integrity of the supporting members is not compromised.

While the invention has been illustrated and described in detail in the drawings and foregoing description, the same is considered as illustrative and not restrictive in character, it being understood that all changes and modification that come within the spirit of the invention are desired to be protected.

What is claimed is:

1. An electrical bus isolation system for isolating and retaining a plurality of bus bars in a parallel, spaced relation to each other, the system comprising:

first and second bus bar supporting members, each including
a first substantially flat surface portion configured to retain a first bus bar;
second and third substantially flat surface portions each disposed on opposite sides of the first surface portion, and defining an offset in height from the first surface portion; wherein
the second and third surface portions of both the first and second supporting members are configured to retain opposite lateral sides of a second bus bar when the supporting members are operatively engaged with corresponding second and third surface portions facing each other, such that the first bus bar is retained in a fixed position relative to the second bus bar in a parallel spaced relationship thereto and at a distance determined by the offset in height.

2. The system according to claim 1 wherein the first and second bus bars are fixed in place by the supporting members and are separated from each other by an air gap such that corona discharge between the bus bars is substantially reduced.

3. The system according to claim 1 wherein the supporting members are E-shaped members such that the first portion is lower in height than the second and third portions.

4. The system according to claim 3 wherein the first and second E-shaped members are secured together and configured to retain and isolate a positive, a negative, and a neutral bus bar, such that the positive bus bar is affixed to the first surface portion of the first E-shaped member, the negative bus bar is affixed the first surface portion of the second E-shaped member, and the neutral bus bar is secured between corresponding second and third surface portions of the E-shaped members.

5. The system according to claim 4 wherein the positive and negative bus bars are affixed to the first surface portion of the E-shaped members by a fastener that is substantially flush with a surface of the corresponding bus bar such that the positive and negative bus bars are fixedly retained in a parallel orientation relative to the neutral bus bar at a distance of about 0.25 inches.

6. The system according to claim 4 wherein the positive and negative bus bars are affixed to the first surface portion of the E-shaped members by a fastener that is substantially flush with a surface of the corresponding bus bar such that the positive and negative bus bars are fixedly retained in a parallel orientation relative to the neutral bus bar at a distance of about between 0.16 inches and 0.35 inches.

7. The system according to claim 4 wherein the positive and negative bus bars are each separated from the neutral bus bar by an air gap such that corona discharge between the bus bars is substantially reduced.

8. The system according to claim 7 wherein the air gap has no insulating material disposed therewithin and the bus bars are non-insulated, said air gap providing electrical isolation sufficient to substantially reduce corona discharge between the bus bars.

9. The system according to claim 7 wherein the air gap has no insulating material disposed therewithin and the bus bars are non-insulated, said air gap providing electrical isolation sufficient to prevent corona discharge between the bus bars.

10. The system according to claim 4 wherein the positive and negative bus bars are each separated from the neutral bus bar by an air gap such that corona discharge between the bus bars is eliminated.

11. The system according to claim 1 wherein the spaced relationship between the first and second bus bars creates an air gap therebetween, said air gap electrically isolating the bus bars from each other sufficient to prevent corona discharge therebetween when a voltage potential of greater than 8,000 volts is applied between the bus bars.

12. The system according to claim 1 wherein at least one of the bus bars is secured to at least one of the first, second, and third surface portions of at least one of the supporting members by a fastener that extends through a fastener gripping portion of at least one of the supporting members for a first predetermined depth, and extends through a second adjacent fastener isolating portion of at least one of the supporting members for a second predetermined depth, said fastener isolating portion having a greater diameter than the gripping portion so as to define a chamber about the fastener, the chamber configured to increase the electrical isolation between the bus bar and at least one of the supporting members.

13. The system according to claim 1 wherein the first and second bus bars are fixed in place by the supporting members and are separated from each other by an air gap such that corona discharge between the bus bars is eliminated.

14. An electrical bus isolation system for isolating and retaining a plurality of bus bars in a parallel, spaced relation to each other, the system comprising:

first and second bus bar supporting members, each including
first means for retaining a first bus bar;
second and third means for retaining a second bus bar, said second and third means for retaining defining an offset in height relative to the first means for retaining; wherein
the second and third means of both the first and second supporting members are configured to retain opposite lateral sides of the second bus bar when the supporting members are operatively engaged with corresponding second and third means facing each other, such that the first bus bar is retained in a fixed position relative to the second bus bar in a parallel spaced relationship thereto and at a distance determined by the offset in height.

15. The system according to claim 14 wherein the first and second bus bars are fixed in place by the supporting members and are separated from each other by an air gap such that corona discharge between the bus bars is eliminated.

16. The system according to claim 14 wherein the supporting members are E-shaped members such that the first means for retaining is lower in height than the second and third means for retaining.

17. The system according to claim 16 wherein first and second E-shaped members are secured together and configured to isolate and retain a positive, a negative, and a neutral bus bar, such that the positive bus bar is affixed to first means for retaining corresponding to the first E-shaped member, the negative bus bar is affixed to the first means for retaining corresponding to the second E-shaped member, and the neutral bus bar is secured between corresponding second and third means for retaining of the corresponding E-shaped members.

18. The system according to claim 17 wherein the positive and negative bus bars are affixed to the E-shaped members by fastening means adapted to be substantially flush with a surface of the corresponding bus bar such that the positive and negative bus bars are fixedly retained in a parallel orientation relative to the neutral bus bar at a distance of about 0.25 inches.

19. The system according to claim 17 wherein the positive and negative bus bars are fixedly retained in a parallel orientation relative to the neutral bus bar at a distance of about between 0.16 inches and 0.35 inches.

20. The system according to claim 17 wherein the positive and negative bus bars are each separated from the neutral bus bar by an air gap such that corona discharge between the bus bars is substantially reduced.

21. The system according to claim 20 wherein the air gap has no insulating material disposed therewithin and the bus bars are non-insulated, said air gap providing electrical isolation sufficient to prevent corona discharge between the bus bars.

22. The system according to claim 20 wherein the air gap has no insulating material disposed therewithin and the bus bars are non-insulated, said air gap providing electrical isolation sufficient to substantially reduce corona discharge between the bus bars.

23. The system according to claim 17 wherein the positive and negative bus bars are each separated from the neutral bus bar by an air gap such that corona discharge between the bus bars is eliminated.

24. The system according to claim 14 wherein the spaced relationship between the first and second bus bars creates an air gap therebetween, said air gap electrically isolating the bus bars from each other sufficient to substantially prevent corona discharge therebetween when a voltage potential of about 8,000 volts is applied between the bus bars.

25. The system according to claim 14 wherein at least one of the bus bars is secured to at least one of the first, second, and third surface means for retaining by a fastener that extends through a fastener gripping portion of at least one of the supporting members for a first predetermined depth, and extends through a second adjacent fastener isolating portion of at least one of the supporting members for a second predetermined depth, said fastener isolating portion defining a chamber about the fastener configured to increase the electrical isolation between the bus bar and at least one of the supporting members.

26. The system according to claim 14 wherein the first and second bus bars are fixed in place by the supporting members and are separated from each other by an air gap such that corona discharge between the bus bars is substantially reduced.

* * * * *